US005577109A

United States Patent [19]

Stimson et al.

[11] Patent Number: 5,577,109
[45] Date of Patent: *Nov. 19, 1996

[54] PRE-PAID CARD SYSTEM AND METHOD

[75] Inventors: Charles J. Stimson; Brady S. Beshear, both of Garland, Tex.

[73] Assignee: Call Processing, Inc., Dallas, Tex.

[*] Notice: The term of this patent shall not extend beyond the expiration date of Pat. No. 5,511,114.

[21] Appl. No.: 407,094

[22] Filed: Mar. 20, 1995

Related U.S. Application Data

[63] Continuation-in-part of Ser. No. 254,237, Jun. 6, 1994, Pat. No. 5,511,114.

[51] Int. Cl.$^6$ ................................................ H04M 17/00
[52] U.S. Cl. .................... 379/112; 379/114; 379/144; 379/130; 379/91; 340/825.34; 235/381
[58] Field of Search ........................... 379/91, 92, 112, 379/114, 115, 121, 130, 131, 144; 235/380, 381; 340/825.34, 825.35

[56] References Cited

U.S. PATENT DOCUMENTS

| | | | |
|---|---|---|---|
| 4,951,308 | 8/1990 | Bishop et al. ..................... | 375/144 X |
| 5,146,067 | 9/1992 | Sloan et al. ........................ | 235/381 |
| 5,352,876 | 10/1994 | Wantanabe et al. ................ | 235/381 |
| 5,409,092 | 4/1995 | Itako et al. ........................ | 235/38 X |

FOREIGN PATENT DOCUMENTS

| | | | |
|---|---|---|---|
| 62-54623 | 9/1987 | Japan ................................. | 379/144 |

*Primary Examiner*—Wellington Chin
*Assistant Examiner*—Pal Loomis
*Attorney, Agent, or Firm*—David H. Judson

[57] ABSTRACT

A pre-paid card system enables customers to make purchases using an authorized card. The system includes four main functional components: a plurality of cards, a host computer, a plurality of on-site activation terminals and a main processor. Each of the cards having a security number associated therewith. The card is typically formed of cardboard, paper or plastic and may include the security number in cleartext under a suitable blackout. The main management and processing of the system is effected by the host computer. The host includes a database for storing security numbers associated with authorized cards. The data terminals are remote from the host computer and connectible thereto for transmitting data between the terminals and the host computer. The processor is controlled by the host computer for enabling customer purchases using the authorized cards.

10 Claims, 2 Drawing Sheets

PRE-PAID CARD SYSTEM AND METHOD

RELATED APPLICATIONS

This application is a continuation in part of U.S. Ser. No 08/254,237, filed Jun. 6, 1994 now U.S. Pat. 5,511,114.

TECHNICAL FIELD

The present invention relates generally to pre-paid services and more particularly to a pre-paid card systems having a remote terminal to provide on-site activation and recharging of cards in customer-defined amounts.

BACKGROUND OF THE INVENTION

Pre-paid calling card services are well-known in the art. Such cards are typically purchased from vending machines and the like and come in fixed value increments, for example, $10, $20 and $50. A $10 card provides the customer with a certain number (e.g., 30) minutes of long distance time from any touch-tone telephone to any location in the United States, regardless of the time of the call; the $20 card provides twice that amount, and so forth. Because the long distance charges are limited to the card's face value, neither the customer nor anyone who obtains possession of the card can run up a large bill.

In operation of the prior art system, cards are batch-activated by the card provider in a limited number of predetermined values. A customer purchases one of these pre-activated cards by paying a fee. The card typically includes a predetermined identification code (which may be obscured by a scratch off material). To use the card, the customer accesses the service (usually through an 800-number), enters the identification code (typically obtained from the back of the card), dials the destination number and the call begins. Prior to dialing, the system may inform the user of a then-current card balance. If during a call the time remaining on the card is about to expire, the customer may be prompted (through a voice over) that only a certain amount of time (e.g., 30 seconds) remains. When the designated time has expired, the call is automatically terminated.

Such systems have proved commercially successful and desirable for several reasons. Pre-paid calling card customers avoid collect and operator assistance surcharges, and they can obtain long distance calling without credit and without payment of monthly bills. The cards themselves are easy to use. While the prior art systems have proven advantageous, they have somewhat limited flexibility. The most significant drawback is the requirement that pre-paid calling cards be issued in fixed or preset amounts. Also, once the time allotted to a particular calling card expires, the card is typically discarded, requiring the customer to carry multiple cards that can be stolen or lost. Existing systems do not have the flexibility to allow the customers to purchase variable amounts of calling time or to recharge "used" cards at the retail site.

There is thus a need for improved telephone pre-paid calling card systems that overcome these and other problems associated with the prior art.

BRIEF SUMMARY OF THE INVENTION

It is an object of the present invention to provide a pre-paid card system that includes on-site activation of cards in varying amounts.

It is still another object of the invention to provide a pre-paid card system and method that facilitates point-of-sale activation of cards using data terminals connectible to a host computer.

It is yet another object of the present invention to provide a card system wherein on-site recharging is provided to enable a pre-paid card to be reactivated and re-used following expiration of all, part or none of an initial authorization amount.

It is a further object of the invention to provide a pre-paid card system having a plurality of data terminals remotely connectible to a host computer, each of the data terminals providing on-site point-of-sale activation and recharging of cards in varying amounts. The host computer dynamically manages each of the authorized cards.

It is still another object of the invention to provide a pre-paid card system wherein each authorized card has a security number associated therewith for enabling a host computer to track usage, rechargings, recharge locations and similar management information. Preferably cards are authorized or re-authorized for variable amounts although "stale" cards, i.e., cards that have been sold but not used or reauthorized for a predetermined time period (e.g., 6 months) may be purged from the system.

It is still a further object of the invention to provide a pre-paid card system wherein the host computer maintains a database of authorized cards, the database including detailed information about the authorization, recharge and use status of each card in the system.

In a preferred embodiment, a pre-paid calling card system enables customers to access a telephone network and obtain long distance telephone service. The system includes four main functional components: a plurality of calling cards, a host computer, a plurality of activation terminals and a call processor. Each of the calling cards preferably includes a body portion and a read-only memory stripe having stored therein a security number. The card is typically formed of cardboard or plastic and may include the security number in cleartext under a suitable blackout. The main management and processing of the system is effected by the host computer, which is connectible to the telephone network. The host includes a database for storing security numbers associated with authorized calling cards. The data terminals are remote from the host computer and connectible thereto for transmitting data between the terminals and the host computer. The call processor is controlled by the host computer for interfacing one or more customers to the telephone network using the authorized calling cards.

Preferably, each data terminal includes means (such as a cardreader) for reading a calling card to determine the security number stored in the read-only memory thereof, means (such as a keypad) for entering any monetary amount corresponding to an amount of call authorization associated with a particular calling card, means (such as a modem) for dialing the host computer to transfer the security number, the call authorization amount and the data terminal identification, and means (such as a display) for receiving and displaying a verification message from the host computer authorizing receipt of the monetary amount.

The data terminal allows for variable authorization and recharging of a calling card. When the cardreader cannot detect the security number stored in the memory (which may occur, for example, when the card has been damaged and it is presented for recharging), the data terminal operator may enter the security number using the keypad to enable point-of-sale activation or recharging of the card. By keeping track of the security number and the identification of the authorizing data terminal, the system can generate accounting and/or billing information so that system operator can determine which data terminal operator authorized and/or recharged a particular calling card. This enables the system operator to reconcile all transactions.

In an alternative embodiment of the present invention, a user may activate or recharge a pre-paid card with an authorized dollar amount at a user activation terminal. The pre-paid card may then be used to purchase various goods and services up to the authorized dollar amount. The pre-paid card and activation terminals function in the same manner as discussed above with respect to a calling card. The activation terminals are interfaced with a main processor. The main processor includes a host computer responsible for management and processing of the system through a purchasing network. The host computer includes a data base for storing security numbers associated with authorized purchase cards and enables users to purchase goods and services up to authorized dollar amounts using the authorized pre-paid cards.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
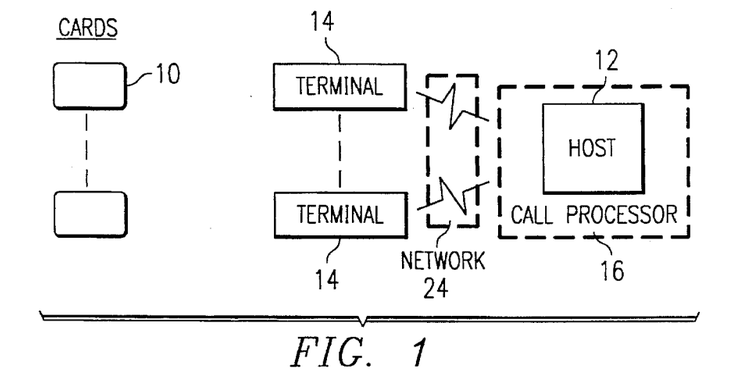
FIG. 1 is a block diagram of the telephone pre-paid calling card system of the present invention.
Figure 2:
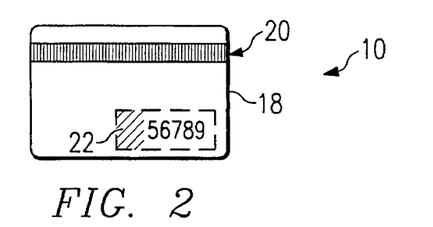
FIG. 2 is a representative pre-paid calling card.

Referring now to the drawings, there is illustrated an exemplary pre-paid calling card system that enables customers to access a telephone network and obtain long distance telephone service. As seen in FIG. 1, the system includes four main functional components: a plurality of calling cards 10, a host computer 12, a plurality of on-site activation terminals 14 and a call processor 16. As seen in FIG. 2, each of the calling cards preferably includes a body portion 18 and a read-only memory stripe 20 having stored therein a security number. The card is typically formed of cardboard, paper or plastic and may include the security number in cleartext under a suitable user-removable scratch-off or other material 22 (such as an opaque tape). If desired, a smart card may be used to store the security number or other information, although preferably the system and method are implemented with so-called "dumb" or non-intelligent cards.

The main management and processing of the system is effected by the host computer 12, which is connectible to the telephone network 24. Although not meant to be limiting, preferably the host computer is a general purpose x86-type personal computer running a multi-tasking operating system such as UNIX. Alternatively, the host computer is implemented with any WINDOWS-based operating system. The host computer has sufficient storage associated therewith to enable a call record to be maintained for every authorized calling card in the system. The call record format will be described below.

Figure 3:
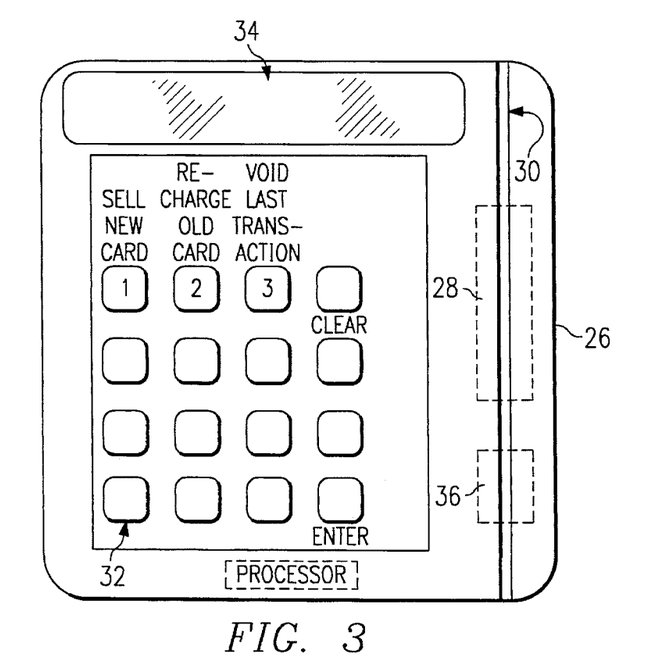
FIG. 3 is a plan view of one of the data terminals of FIG. 1 showing the keypad, display and card swipe components of the unit.

Each of the plurality of on-site activation terminals 14 is preferably a Model XL300 from Verifone, although other models may be used. As seen in FIG. 3, the activation terminal includes a housing 26 in which a number of functional components are included. A cardreader 28 includes a card-swipe slot 30 for receiving the calling card so that the memory stripe can be read. The unit also preferably includes a keypad 32 with various alphanumeric and control keys, and a display 34. The unit also includes a modem 36 (shown in phantom) for connecting the device over a telephone line to the host computer. The activation terminal also includes appropriate control circuitry for controlling the operation of the device.

Each of the terminals 14 is preferably located at a point-of-sale location where the calling cards are sold to users. The calling cards themselves may be stored under the terminal 14 in any convenient fashion. Generally, the data terminals are remote from the host computer and connectible thereto for transmitting data between the terminals and the host computer.

As can be seen, each data terminal 14 includes means (such as a cardreader) for reading a calling card to determine the security number stored in the read-only memory thereof, means (such as a keypad) for entering any monetary amount corresponding to an amount of call authorization associated with a particular calling card, means (such as a modem) for connecting to the host computer to transfer the security number, the call authorization amount and the data terminal identification, and means (such as a display) for receiving and displaying a verification message from the host computer authorizing receipt of the monetary amount. These particular input/output devices of the data terminal are merely exemplary, as other equivalent devices may also be used. For example, the cardreader may be replaced or supplemented with an optical scanner (to read a bar code or the like). When the cardreader cannot detect the security number stored in the memory (which may occur, for example, when the card is presented for recharging), the data terminal operator may enter the security number using the keypad to enable point-of-sale activation or recharging of the card. Likewise, the keypad may be replaced or supplemented with a voice recognition card connected to a microphone for providing limited speaker-independent or speaker-dependent discrete or continuous voice recognition. The communications link need not be made over a telephone line, but may be wireless, fiber optic or include any other well-known means for establishing a communications link between two locations. The display itself may be aural as opposed to visual.

The data terminals allow for point-of-sale variable authorization and recharging of calling cards. By keeping track of the security number and the identification of the authorizing data terminal, the system can generate accounting and/or billing information so that system operator can determine which data terminal operator authorized and/or recharged a particular calling card. This enables the system operator to reconcile all transactions.

The call processor of FIG. 1 is controlled by the host computer for interfacing one or more customers to the telephone network using the authorized calling cards. In the preferred embodiment, the call processor includes dedicated hardware and software for interfacing each of the data terminals to the host computer and to the telephone network. The call processor includes a T1 interface card (made by Mitel) which provides an external interface for two digital T1 circuits. In the system, one T1 circuit interfaces to the data terminals, and the other T1 circuit interfaces to the telephone network. Each T1 card has a bandwidth of 24 multiplexed 64 K-bit/second channels. The call processor also includes a number of call processing boards to playback voice files, record voice for other applications such as voice mail, recognize DTMF signalling, outdial DTMF on the outbound portions of each call, and monitor call progress. Preferably each board is a Natural Microsystems Model VBX 1200 (and/or AG24), which includes a digital signal processor, and each such board handles up to 12 or 24 ports, respectively. In operation, each call in the system is assigned a port.

Preferably, each call record established in the system includes a number of pieces of information: the calling card security number, the identity of the store at which the card was issued (i.e., the identification of the authorizing terminal), the card's issue date and time, the card's last use date and time, the card's last recharge store number (i.e., the identify of the data terminal at which the card was last recharged), the card balance ($xxx.xx), the card's last recharge amount, a "card-in-use" flag and the card's last recharge date and time. By keeping track of the data terminals at which a card is initially authorized and later recharged, the system operator can reconcile multiple data from different store locations. This enables the system operator to credit or charge store operators for recharging provided by other store operators in the system.

The operation of the system can now be described. In a preferred call scenario, the possessor of an activated calling card first accesses the service through a dedicated telephone number (such as an 800 number) to which the host computer/call processor are connected. Upon call connection, the user is prompted to enter "security code" from back of card. The host computer checks the database and gives the appropriate response such as "your balance is_____minutes." Alternatively, the computer may issue a message that "this card was purchased or last recharged more than 6 months ago, please buy more TeleBuck$$^{SM}$ and call again" or "this security code is invalid" as the case may be. If there is a balance, the computer prompts the user to enter the area code and number that the user desires to call. The call is connected and if an answer is detected, the computer keeps track of the minutes used as the call proceeds. If the balance reaches 2 minutes, the caller is warned with a "2 minutes left" message and likewise at 30 seconds. When the balance is exhausted, the computer cuts off in the conversation and plays a message such as "time is up, buy more TeleBuck$$^{SM}$ at any retail location or call us at 1 800 xxx-xxxx for recharge options".

The following is a typical card activation or recharging scenario. Assume a customer comes up to the counter and requests $12 worth of calling time. The clerk then obtains the next calling card from the plurality of cards, and begins the activation process. This is achieved by pressing the "Sell New Card" key (1). The new card is then swiped through the card reader slot. The amount of the transaction is then entered on the keypad. At this point the terminal dials out via the modem and waits for an answer. After communicating with the host, transmitting the request, the card and terminal identifiers, and receiving a verification, the unit displays a suitable response message. The operator is then prompted to collect the funds and this message (e.g., by a message, "Done Collect $xxx.xx") tells the operator that the security number on this card has been activated for the amount shown. The transaction is completed by giving the card to the customer. If the customer desires to pay using a credit card which itself needs to be verified, the data terminal may also be used for this purpose. It should be further noted that the data terminals 14 may be implemented in existing payment terminals such as credit card, ATM or money order machines, and these existing payment terminals may be modified to accept other forms of payment.

Figure 4:
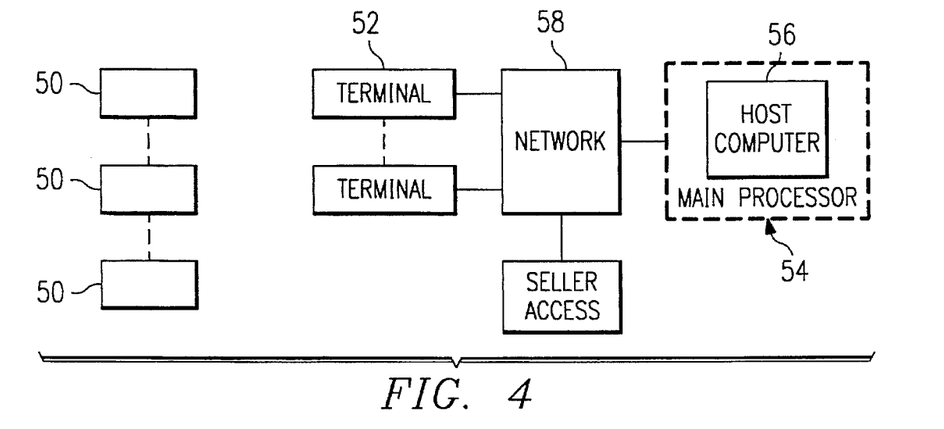
FIG. 4 is a block diagram of an alternative embodiment of the invention utilizing a pre-paid card system for purchasing a variety of goods and services up to an authorized dollar amount.

Referring now to FIG. 4, there is illustrated an alternative embodiment of the present invention wherein there is illustrated a block diagram of a pre-paid card system. Unless otherwise specified, this embodiment functions in much the same manner as the pre-paid calling card system discussed with respect to FIGS. 1 through 3. In this embodiment a variable amount of money is pre-authorized into a card 50. The pre-paid cards 50 include a body position 18 and read only memory stripe 20 having a security number stored thereon as shown in FIG. 2; alternatively, the security number may be the user's account number, a personal identification number (PIN) or some other information generally known only to the user whether encoded on the card 50 or not. The cards 50 may be credit cards, debit cards, smart cards, or any other type of purchasing card which is currently available or may in the future become generally available. The cards 50 are activated or recharged at a plurality of on-site activation terminals 52. The on-site activation terminals 52 have the same hardware and characteristics as the terminal discussed with respect to FIG. 3. The on-site activation terminals 52 interact with a main processor 54 operated by a host computer 56 via any of a variety of types of interconnecting networks 58, for example, a telephone network.

The hardware and software for implementing the main processor 54 and host computer 56 are similar to that discussed with respect to the call processor 16 and host computer 12 of FIG. 1. The host computer 56 contains sufficient storage associated therewith to enable purchase records to be maintained for each authorized card 50 in the system. Preferably, each purchase record established in the system includes a number of pieces of information: the card security number, the identity of the store at which the card was issued (i.e., the identification of the authorizing terminal), the card's issue date and time, the card's last use date and time, the card's last recharge number (i.e., the identity of the data terminal at which the card was last recharged), the purchase balance of the card ($xxx.xx), the card's last recharge amount, the card's last recharge date and time, and transaction codes associated with each purchase. By keeping track of the data terminals at which the card is initially authorized and later recharged, the system operator can reconcile multiple data from different locations. This enables the system operator to credit or charge store operators for recharging providing by other store operators in the system.

The operation of the system may now be described. In a preferred purchase scenario, the user of an activated card makes his purchase of a particular service or good and provides the card to a representative of the selling party. The seller or user is prompted to enter the "security code" from the back of the card 50. The security code may be entered by a magnetic card reader, manual entry or any other well known method. Entry of the security code enables access to the main processor 54 via a dedicated purchasing network, such as a telephone 800 number or other well-known type of communications method. Additionally, the user may manually enter a personal code (PIN number) known only to the user as an additional security measure. A purchase amount is also entered indicating the amount of a desired purchase. The host computer 56 of the main processor 54 checks the database for the data associated with the codes and notifies the seller and/or user if a sufficient balance is present to make the desired purchase. If a sufficient balance is not available, the host computer 56 may issue a receipt or message indicating the available balance and updated information concerning the purchase record. If a sufficient balance is present, the host computer 56 deducts the entered purchase amount from the card's balance and associates a transaction code with the purchase. The seller then completes the sale to the user. Upon completion of the sale, the user is provided with a receipt indicating the remaining balance on their card 50 or other information relating to their purchase record.

The card activation or recharging scenario is the same as that previously discussed with respect to a pre-paid calling card. The card 50 is activated or recharged with a set dollar amount enabling a user to purchase goods and services up to the pre-paid limit at any location that accepts said card as payment. During a typical card activation scenario, a customer requests an additional balance on the card from an activation terminal 52. This may be done directly by the user or through a clerk manning the terminal. The card is swiped through the card reader slot and the amount to be added to the pre-authorized card balance is entered on the keypad. At this point, the terminal dials out via the modem and awaits a response from the host computer 56. After communicating with the host computer 56 and transmitting the required information, the activation terminal 52 receives and displays a suitable response message. The clerk or user is then prompted to provide the required funds and is informed that the security number on the card has been activated for the amount shown. The transaction is completed by returning the card to the customer.

It is to be further noted that while the present invention has been described with respect to providing a pre-paid calling card system or a pre-paid card system, that the purchase of any goods, service or activity may utilize the pre-paid card system of the present invention as an alternative to pay-as-you-go or credit services.

It should be appreciated that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A pre-paid card system to enable users to obtain goods or services using cards having pre-authorized, purchasing limit amounts comprising:

a plurality of cards, each of said cards having a security number associated therewith;

a host computer including at least one input port and a database for storing security numbers;

at least one data terminal located at a predetermined location remote from the host computer and connectable to the input port for associating, at the host computer, a purchasing limit amount with a security number of a pre-authorized card using data transmitted between the data terminal and the host computer during one or more charging transactions, the means for associating of the data terminal including:

means for entering a the security number;

means, operative during any initial transaction and any recharge transaction, for entering any monetary amount representing the purchasing limit amount;

means for connecting to the host computer to transfer the security number and the purchasing limit amount;

means responsive to the transfer for receiving a verification message from the host computer authorizing receipt of the monetary amount to thereby associate at the host computer the purchasing limit amount to the security number, wherein the card does not store the purchasing limit amount;

wherein the database includes a record for each card security number having a purchasing limit amount associated therewith, the record including a balance; and a main processor running on the host computer and responsive to entry of the security number for authorizing a user to purchase goods or services valued up to the purchasing limit amount using the card, the main processor using the balance in the record associated with the security number for monitoring purchase amounts and terminating the user's authorization to purchase goods or service when the balance is exhausted.

2. The pre-paid card system as described in claim 1 wherein the for entering a security number comprises a cardreader.

3. The pre-paid card system as described in claim 1 wherein the means for entering monetary amounts comprises a keypad.

4. The pre-paid card system as described in claim 1 wherein the means for connecting to the host computer comprises a modem.

5. The pre-paid card system as described in claim 1 wherein the means for receiving comprises a display.

6. A pre-paid card system to enable customers to purchase pre-paid cards at retail establishments and to use such pre-paid cards to obtain goods or services, comprising:

a plurality of cards, each of said cards having a security number associated therewith that must be entered to obtain goods and services using the prepaid card;

a host computer including at least one input port and a database for storing security numbers;

a plurality of data terminals located at the retail establishments remote from the host computer and each connectable to the input port for associating, at the host computer, a purchasing limit amount with a security number of a pre-paid card using data transmitted between the data terminal and the host computer during one or more charging transactions, the means for associating of each data terminal including:

means for reading a calling card to determine the security number;

means, operative during any initial transaction and any recharge transaction, for entering a monetary amount corresponding to the purchasing limit amount;

means for transferring to the host computer the security number corresponding to the purchasing limit amount and the purchasing limit amount; and means responsive to the transfer for receiving a verification message from the host computer authorizing receipt by the retail establishment of the monetary amount to thereby associate at the host computer the call authorization amount with the security number, wherein the prepaid card does not store the purchasing limit amount;

wherein the database includes a record for each prepaid card security number, the record including the initial authorization amount and any recharge authorization amount, a balance, and data terminal identification codes identifying the data terminals of the plurality of data terminals at which the initial and any recharge authorization amounts are issued; and a main processor running on the host computer and responsive to entry of the security number for authorizing a user to purchase goods or services up to the selectively determined purchasing limit using the authorized card, the main processor using the balance in the record associated with the security number for monitoring total amount of purchases and disallowing purchases when the balance is exhausted.

7. A method to enable customers to purchase calling cards at predetermined locations and to use such calling cards to access a telephone network having at least one telephone, each of said calling cards having a security number associated therewith that must be entered at a telephone to obtain access to the telephone network, comprising the steps of:

in response to one or more predetermined requests, transferring information from a data terminal to a remote host computer having a database, the information including data identifying a calling card to be activated or recharged;

associating, at the host computer, an amount of call authorization to a security number of the calling card using the information transferred;

transmitting a verification message from the host computer to the data terminal;

maintaining in the database a record for each calling card security number having a call authorization amount associated therewith, the record including a balance; and using the balance in the record associated with the security number for monitoring call progress; and terminating access to the telephone network when the balance is exhausted.

8. A method to enable customers to purchase and use cards to access a network having at least one access device, each of said cards having a security number associated therewith that must be entered at an access device to obtain access to the network, comprising the steps of:

in response to one or more requests, transferring information from a communications device to a remote host computer having a database, the information including data identifying a card to be activated or recharged;

associating, at the host computer, an amount of access authorization to a security number of the card using the information transferred;

transmitting a verification message from the host computer to the communications device;

maintaining in the database a record for each card security number having an access authorization amount associated therewith, the record including a balance; and using the balance in the record associated with the security number for monitoring usage of the network from the access device; and terminating access to the network when the balance is exhausted.

9. A method, using one or more remote communications devices connectable to a host computer having a database, to enable customers to acquire credit to be used to purchase good or services, comprising the steps of:

in response to one or more requests, transferring information from a communications device to the host computer, the information including data identifying a card to be activated or recharged, the card having an identifying number;

associating, at the host computer, an amount of purchase authorization to the identifying number of the card using the information transferred from the communications device;

maintaining in the database a record for each card identifying number having an purchase authorization amount associated therewith, the record including a credit balance; and adjusting the credit balance in the record associated with the identifying number as goods or services are purchased.

10. A method, using one or more remote communications devices connectable to a host computer having a database, to enable customers to acquire call authorization credit, comprising the steps of:

in response to one or more requests, transferring information from a communications device to the host computer, the information including data identifying a card to be activated or recharged, the card having an identifying number;

associating, at the host computer, an amount of call authorization to the identifying number of the card using the information transferred from the communications device;

maintaining in the database a record for each card identifying number having a call authorization amount associated therewith, the record including a call authorization balance; and adjusting the call authorization balance in the record associated with the identifying number as the card is used to obtain network access.

* * * * *

(12) EX PARTE REEXAMINATION CERTIFICATE (8053rd)
United States Patent
Stimson et al.

(10) Number: US 5,577,109 C1
(45) Certificate Issued: Mar. 1, 2011

(54) PRE-PAID CARD SYSTEM AND METHOD (75) Inventors: Charles J. Stimson, Garland, TX (US); Brady S. Beshear, Garland, TX (US)

(73) Assignee: TGIP, Inc., Dallas, TX (US)

Reexamination Request:
No. 90/007,436, Mar. 1, 2005

Reexamination Certificate for:
Patent No.: 5,577,109
Issued: Nov. 19, 1996
Appl. No.: 08/407,094
Filed: Mar. 20, 1995

Related U.S. Application Data (63) Continuation-in-part of application No. 08/254,237, filed on Jun. 6, 1994, now Pat. No. 5,511,114.

(51) Int. Cl.
G06Q 20/00 (2006.01)
G07F 7/00 (2006.01)
G07F 7/02 (2006.01)
G07F 7/12 (2006.01)
H04M 17/00 (2006.01)

(52) U.S. Cl. .................. 379/114.2; 379/114.15; 379/130; 379/144.04; 379/91.02; 235/381; 340/5.9

(58) Field of Classification Search .............. None
See application file for complete search history.

(56) References Cited

U.S. PATENT DOCUMENTS

| | | | |
|---|---|---|---|
| 3,652,795 A | 3/1972 | Wolf et al. | |
| 4,439,636 A | 3/1984 | Newkirk et al. | |
| 4,575,622 A | 3/1986 | Pellegrini | |
| 4,587,379 A | 5/1986 | Masuda | |
| 4,706,275 A | 11/1987 | Kamil | |
| 4,707,592 A | * 11/1987 | Ware | 235/379 |
| 4,757,186 A | * 7/1988 | Heberle et al. | 235/380 |
| 4,776,000 A | 10/1988 | Parienti | |
| RE32,985 E | * 7/1989 | Nagata et al. | 705/41 |
| 4,877,947 A | 10/1989 | Mori | |

(Continued)

FOREIGN PATENT DOCUMENTS

| | | |
|---|---|---|
| JP | 2217991 | 8/1990 |
| JP | 2308390 | 12/1990 |
| JP | 3011492 | 1/1991 |
| JP | 403198194 A | 8/1991 |
| JP | 4-23659 | 1/1992 |
| JP | 5035969 | 2/1993 |

OTHER PUBLICATIONS

Stimson, "Prepaid Calling Cards—Friend or Foe?", Public Communications Magazine, pp. 18–20, (Aug. 1994).
Peoples Telephone Company, Inc. Form 10–K, Mar. 31, 1993, pp. 1–18.
Peoples Telephone Company, Inc. Form 10–K, Apr. 4, 1994, pp. 1–18.

(Continued)

Primary Examiner—Roland G Foster (57) ABSTRACT

A pre-paid card system enables customers to make purchases using an authorized card. The system includes four main functional components: a plurality of cards, a host computer, a plurality of on-site activation terminals and a main processor. Each of the cards having a security number associated therewith. The card is typically formed of cardboard, paper or plastic and may include the security number in cleartext under a suitable blackout. The main management and processing of the system is effected by the host computer. The host includes a database for storing security numbers associated with authorized cards. The data terminals are remote from the host computer and connectible thereto for transmitting data between the terminals and the host computer. The processor is controlled by the host computer for enabling customer purchases using the authorized cards.

U.S. PATENT DOCUMENTS

| | | | |
|---|---|---|---|
| 4,879,744 A | 11/1989 | Tasaki et al. | |
| 4,951,308 A | 8/1990 | Bishop et al. | |
| 4,975,942 A | 12/1990 | Zebryk | |
| 5,068,891 A | 11/1991 | Marshall | |
| 5,086,457 A | 2/1992 | Barraud et al. | |
| 5,093,787 A * | 3/1992 | Simmons | 705/33 |
| 5,101,098 A | 3/1992 | Naito | |
| 5,138,650 A | 8/1992 | Stahl et al. | |
| 5,146,067 A | 9/1992 | Sloan et al. | |
| 5,155,342 A | 10/1992 | Urano | |
| 5,163,086 A | 11/1992 | Ahearn et al. | |
| 5,192,947 A | 3/1993 | Neustein | |
| 5,225,666 A | 7/1993 | Amarena et al. | |
| 5,225,977 A | 7/1993 | Hooper et al. | |
| 5,226,073 A | 7/1993 | Albal et al. | |
| 5,264,689 A | 11/1993 | Maes et al. | |
| 5,265,155 A | 11/1993 | Castro | |
| 5,266,782 A | 11/1993 | Alanara et al. | |
| 5,287,269 A | 2/1994 | Dorrough et al. | |
| 5,327,482 A | 7/1994 | Yamamoto | |
| 5,327,485 A | 7/1994 | Leaden | |
| 5,352,876 A | 10/1994 | Watanabe et al. | |
| 5,353,335 A | 10/1994 | D'Urso | |
| 5,359,182 A | 10/1994 | Schilling | |
| 5,359,642 A | 10/1994 | Castro | |
| 5,371,493 A | 12/1994 | Sharpe et al. | |
| 5,381,467 A | 1/1995 | Rosinski et al. | |
| 5,396,558 A | 3/1995 | Ishiguro et al. | |
| 5,408,519 A | 4/1995 | Pierce et al. | |
| 5,409,092 A | 4/1995 | Itako et al. | |
| 5,440,108 A | 8/1995 | Tran et al. | |
| 5,450,477 A | 9/1995 | Amarant et al. | |
| 5,469,497 A | 11/1995 | Pierce et al. | |
| 5,477,038 A | 12/1995 | Levine et al. | |
| 5,479,494 A * | 12/1995 | Clitherow | 379/114.15 |
| 5,481,600 A | 1/1996 | Alesio | |
| 5,504,808 A | 4/1996 | Hamrick, Jr. | |
| 5,532,876 A | 7/1996 | Gauer et al. | |
| 5,546,446 A | 8/1996 | Tsunokawa et al. | |
| 5,557,086 A | 9/1996 | Schulze et al. | |
| 5,557,087 A * | 9/1996 | Duyck | 235/380 |
| 5,557,516 A * | 9/1996 | Hogan | 705/41 |
| 5,583,918 A * | 12/1996 | Nakagawa | 455/409 |
| 5,590,181 A | 12/1996 | Hogan et al. | |
| 5,621,787 A | 4/1997 | McKoy et al. | |
| 5,629,977 A | 5/1997 | Fonseca | |
| 5,640,447 A | 6/1997 | Fonseca | |
| 5,644,118 A * | 7/1997 | Hayashida | 235/379 |
| 5,684,291 A | 11/1997 | Taskett | |
| 5,708,422 A | 1/1998 | Blonder et al. | |
| 5,719,926 A | 2/1998 | Hill | |
| 5,749,075 A | 5/1998 | Toader et al. | |
| 5,753,899 A | 5/1998 | Gomm et al. | |
| 5,790,636 A | 8/1998 | Marshall | |
| 5,825,863 A | 10/1998 | Walker | |
| 5,838,774 A | 11/1998 | Weisser, Jr. | |
| 5,864,609 A | 1/1999 | Cross et al. | |
| RE36,116 E * | 2/1999 | McCarthy | 705/16 |
| 5,884,292 A | 3/1999 | Baker et al. | |
| 5,953,398 A | 9/1999 | Hill | |
| 5,988,509 A | 11/1999 | Taskett | |
| 6,003,770 A | 12/1999 | Schilling | |
| 6,115,458 A | 9/2000 | Taskett | |
| 6,188,752 B1 | 2/2001 | Lesley | |
| 6,236,851 B1 | 5/2001 | Fougnies et al. | |
| 6,270,012 B1 | 8/2001 | Dawson | |
| 6,295,344 B1 | 9/2001 | Marshall | |

OTHER PUBLICATIONS

The LCX 120C Switch, Jul. 18, 1991, pp. 1–4.

NTS Features Summary, Chapter One—Overview, Release 4.0, May 1991, pp. 1–18.

News from NACT, Dec. 1991, pp. 1–3.

Hough, Prepaid telephone calling cards launched, DataWave Vending, Inc. press release, Nov. 9, 1994.

Discount Long–Distance Digest, vol. 1, #28, Jun. 28, 1994.

Discount Long–Distance Digest, vol. 1, #28, Aug. 28, 1994.

Discount Long–Distance Digest, Back Issue #3, Jan. 7, 1994.

Discount Long–Distance Digest, vol. 1, #10, Feb. 28, 1994.

Discount Long–Distance Digest, vol. 1, #12, Mar. 14, 1994.

Discount Long–Distance Digest, vol. 1, #16, Apr. 4, 1994.

Discount Long–Distance Digest, vol. 1, #18, Apr. 18, 1994.

Discount Long–Distance Digest, vol. 1, #21, May 9, 1994.

Discount Long–Distance Digest, vol. 1, #42, Oct. 10, 1994.

Discount Long–Distance Digest, vol. 1, #43, Oct. 17, 1994.

Discount Long–Distance Digest, #61, Oct. 14, 1995.

Discount Long–Distance Digest, #55, Apr. 18, 1995.

Levine, Please deposit no cents, Forbes, vol. 152, #4, p. 102, Aug. 16, 1993.

Panurach, Money in Electronic Commerce: Digital Cash, Electronic Fund Transfer, and Ecash, Communications of the ACM, vol. 39, #6, Jun. 1996.

"Dominance of smart cards in France working its way into phone applications," Card News, vol. 5, #17, Sep. 10, 1990.

"Sprint/United, Sprint/Centel put a holiday twist on prepaid calling card craze," Business Wire, Nov. 10, 1994.

"MCI announces prepaid calling cards," Newsbytes News Network, Jun. 8, 1994.

"GTE intros prepaid phone cards for Japanese visitors," Newsbytes News Network, Jan. 18, 1990.

"Mercury prepares for phone card sales boost," Newsbytes News Network, Jan. 15, 1992.

"Fone America in deal for truckers," Newsbytes News Network, Oct. 8, 1993.

Hough, "First major order telecard machine from US company," DataWave Vending, Inc. press release, Jan. 16, 1995.

"Rochester Telephone introduces calling card," Newsbytes News Network, May 8, 1990.

"Bell Atlantic testing prepaid money cards—money access service," Newsbytes News Network, Mar. 2, 1992.

Toffler, et al., "Powershift: Knowledge, Wealth and Violence at the Edge of the 21st Century," pp. 65–66, 1990.

"Prepaid calling card: Incomnet launches new Euro–style calling card," Edge, on & about AT&T, vol. 8, #274, Oct. 25, 1993.

"Bottom Line Telecommunications Strikes Deal with Circle K Stores," Bottom Line Telecommunications, Inc. press release, Oct. 23, 1995.

"Prepaid Phone Card Introduces Point–of–Sale Activation," Bottom Line Telecommunications, Inc. press release, Nov. 28, 1995.

"Bottom Line and 7–Eleven Provide Prepaid Long Distance Convenience," Bottom Line Telecommunications, Inc. press release, Nov. 11, 1994.

"Bottom Line Telecommunications Supplies Prepaid Phone Time To Major ATM Network," Bottom Line Telecommunications, Inc. press release, Oct. 19, 1994.

"Card Game," Brandweek, vol. XXXV, No. 42, Oct. 31, 1994.

Robrock II, "The Intelligent Network—Changing the Face of Telecommunications," Proceedings of the IEEE, vol. 79, No. 1, Jan. 1991.

ATS III/65 Automated Long Distance Telephone Service User's Guide, Version 2.0, National Applied Computer Technologies, Oct. 1983.

Confalone et al., "Calling Card Service—TSPS Hardware, Software, and Signaling Implementation," The Bell Atlantic Technical Journal, vol. 61, No. 7, Sep. 1982, pp. 1675–1714.

Khandheria, "Dialing For Debit Dollars," TE&M, Apr. 15, 1993, pp. 74, 76 and 80.

Pray et al., "The Power of Plastic," Tallahassee Magazine, Sep./Oct. 1994, p. 29+.

Quinn, "College Cards Make The Grade," IDSystems, vol. 13, No. 10, Oct. 1993, pp. 26, 28 and 30.

Twiggs, "Seminole Access city–wide, but that's not all," FSView, vol. 1, No. 38, Feb. 24–Mar. 2, 1993.

James et al., "Turning A Private Label Bank Card Into A Multi–Function Campus ID Card," Cause/Effect, vol. 14, No. 2, Summer 1991.

Norwood, "Evolution of Smart–Card Technology Development at Florida State University," Cause/Effect, vol. 17, No. 1, Spring 1994.

Norwood, "Overview of the FSUCard Program and its History," Presentation (127 pages), with some slides stating "Card Application Technology Center 1995".

"Making the CampusConnections Card . . . Come to Life," Presentation (15 pages), Florida State University, 1994.

Basinger et al., "Calling Card Service—Overall Description and Operational Characteristics," The Bell System Technical Journal, vol. 61, No. 7, Sep. 1982, pp. 1655–1673.

Norwood, "The New FSUCard: Changing the face of campus ID cards," May 16, 1996.

Koch, "Mutable markets," CIO Magazine, Dec. 1, 1995.

Arend, Macrologic's ActionNet, Prepaid Calling Card Source '94 Reference Guide, 1st Edition, Apr. 1994, pp. 14–6 to 14–8.

"Landis & Gyr wins BT payphone contract," Newsbytes News Network, Oct. 18, 1991.

"Harris & Quest The Correctional Communications Headquarters" Brochure, 1993.

Seidenberg et al., "GTE Hawaiian Tel introduces prepaid telephone card service," Card News, vol. 5, #2, Jan. 29, 1990.

"Independents tak on giants to win over phone card niches," POS News, vol. 9, #10, Feb. 1993.

"Executive Telecard, Ltd. Introduces World Direct, The Only Global Direct–Dial Prepaid Calling Card," PR Newswire, Nov. 24, 1992.

Wade, "Practical Traveler; Cards for Calls On the Road," Jun. 6, 1993.

McMenemy, "Phone Cards Getting Boost From Parents, Students and Bookstores," College Store Executive, Jul./Aug. 1993.

Lucas, "Dial P for Prepaid Phone Cards," Credit Card Management, Jun. 1993.

"Debit Card Calling System Eliminates Uncollectables," TE&M, Apr. 1, 1993 advertisement.

"Debit Card Pays Off Up–Front Costs," TE&M Magazine, Mar. 15, 1993.

NACT "Your Complete Prepaid Calling Card Solution," Advertisement, Phone +, Aug. 1994.

Transactions, vol. 7, No. 3, Winter 1992, pp. 4–5.

Verifone, "Choosing a Card Systems Company," Verifone Brochure, 1992.

"Prepaid Cards Make The Grade On American Campuses," Transactions, Spring 1992.

"Post Office Gives Prepaid Cards The Stamp of Approval," Transactions, Mar. 1993.

Granzow, Cynosure BBS newsgroup, Jul. 24, 1993 email concerning Western Union prepaid calling card.

Snyder, The Daily News, Oct. 18, 1995 article concerning Bellsouth combination credit card and calling card.

Brooks, "FSU's new debit card gives its students total Access," Tallahassee Democrat, No. 328.

Hannon, "Long–distance lures," U.S. News & World Report, vol. 116, No. 7, Feb. 21, 1994.

Mamis, "Dollars for dialing," Inc. vol. 16, No. 1, Jan. 1994.

Harrop, "The electronic purse (prepayment cards)," Abstract, IEE Review, vol. 38, No. 6, Jun. 18, 1992.

Poe et al., "Need a long–distance hug?" Across The Board, vol. 31, No. 4, Apr. 1994.

Collins, "Smart money betting big on 'dumb' phone cards," New York Times, vol. 143, Issue 49710, May 28, 1994.

MacDonald, "Calling cards on a budget," CFO, vol. 9, No. 9, Sep. 1993.

Denitto, "Ryder debit card makes phone free," Advertising Age, Feb. 7, 1994.

Fitzgerald et al., "Call is out for prepaid phone cards," Advertising Age, vol. 65, No. 12, Mar. 21, 1994.

World Telecom Group, Inc. Press release, Nov. 30, 1993.

"Prepaid phone cards spread quickly into niche markets," Quest Telecommunications EFT Report, Sep. 15, 1993.

O'Hearen, "Pre–paid calling cards strategy guide," Incentive, vol. 169, No. 11, Nov. 1995.

"Prepaid phone card introduces Point–of–Sale Activation," BLT Technologies press release, Business Wire, Nov. 29, 1995.

Quinn, "Pick a card, any card," Incentive, vol. 168, No. 12, Dec. 1994.

Frank, "Old Cards Learn New Tricks," Card Technology, May 1997.

Winick, "Moneycard Collecting Made Easy," 1994.

AT&T Press release concerning AT&T Teleticket, PR Newswire, Mar. 31, 1993.

Hallmark/Sprint Press release, "Hallmark taps Sprint as partner for new Greeting card line," Communications Daily, vol. 13, No. 170, Sep. 2, 1993.

Executive TeleCard, Ltd. press release, PR Newswire, Nov. 24, 1992.

Silberg, "Drawing card (long distance prepaid calling cards)," HFN The Weekly Newspaper, Aug. 28, 1995.

"Buy now, phone later is the strategy of new prepaid cards," POS News, Jun. 1, 1992.

Qualtrough, "Branching out with beepers and phone cards," Video Business, Jan. 13, 1995.

"Best Western to be first worldwide hotel distributor of AT&T Teletickets," PR Newswire, Mar. 9, 1993.

"Prepaid Sales System Using Individual Recognition Card," Patent Abstract of Japan, Publication No. 04043493, Feb. 13, 1992.

Complete Trial Transcript, Civil Action No. 2:06cv–105, styled *TGIP, Inc.* v. *AT&T Corporation,* , Sep. 2007.

Jury Verdict as filed, Civil Action No. 2:06cv–105, styled *TGIP, Inc.* v. *AT&T Corporation,* , Sep. 14, 2007.

Final Judgment, Civil Action No. 2:06cv–105, styled *TGIP, Inc.* v. *AT&T Corporation,* , Oct. 29, 2007.

Order on Defendants' Motions for Judgment as a Matter of Law, Civil Action No. 2:06cv–105, styled *TGIP, Inc.* v. *AT&T Corporation,* , Oct. 29, 2007.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *